United States Patent
Neal et al.

(10) Patent No.: US 9,924,114 B2
(45) Date of Patent: Mar. 20, 2018

(54) INTEGRATED RADIATION SHIELD AND RADIATION STOP

(71) Applicant: DRS RSTA, INC., Melbourne, FL (US)

(72) Inventors: Henry W. Neal, Allen, TX (US); George D. Skidmore, Richardson, TX (US); Jeff R. Emmett, Sachse, TX (US); Richard L. Southerland, Plano, TX (US); Samuel E. Ivey, Richardson, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 460 days.

(21) Appl. No.: 14/208,462

(22) Filed: Mar. 13, 2014

(65) Prior Publication Data
US 2014/0267763 A1    Sep. 18, 2014

Related U.S. Application Data

(60) Provisional application No. 61/784,992, filed on Mar. 14, 2013.

(51) Int. Cl.
| | |
|---|---|
| *G01J 5/20* | (2006.01) |
| *H04N 5/33* | (2006.01) |
| *H04N 17/00* | (2006.01) |
| *H04N 5/225* | (2006.01) |
| *H04N 5/357* | (2011.01) |
| *G01J 5/04* | (2006.01) |

(Continued)

(52) U.S. Cl.
CPC ............ *H04N 5/33* (2013.01); *G01J 5/041* (2013.01); *G01J 5/0806* (2013.01); *G01J 5/20* (2013.01); *H04N 5/2252* (2013.01); *H04N 5/357* (2013.01); *H04N 17/002* (2013.01); *G01J 2005/0077* (2013.01)

(58) Field of Classification Search
CPC ........................................................ H04N 5/33
See application file for complete search history.

(56) References Cited

U.S. PATENT DOCUMENTS

| | | |
|---|---|---|
| 6,144,031 A | 11/2000 | Herring et al. |
| 6,515,285 B1 | 2/2003 | Marshal et al. |

(Continued)

FOREIGN PATENT DOCUMENTS

WO    WO 2014/197073 A2    12/2014

OTHER PUBLICATIONS

Notification of Transmittal of the International Search Report and the Written Opinion of the International Searching Authority, or the Declaration; International Search Report and Written Opinion of the International Searching Authority for International Application No. PCT/US2014/026594 dated Jan. 21, 2015, 10 pages.

*Primary Examiner* — Edwin Gunberg
(74) *Attorney, Agent, or Firm* — Kilpatrick Townsend & Stockton LLP

(57) ABSTRACT

An apparatus includes a detector that measures radiation. The apparatus also includes a window that is relationally coupled to the detector and a shield, so that the window is in between the detector and the shield. The apparatus further includes the shield that emits substantially constant radiation, and substantially blocks radiation from a camera housing at least partially surrounding the shield, so that the detector measures radiation passing through an optical system and the shield.

21 Claims, 6 Drawing Sheets

(51) Int. Cl.
*G01J 5/08* (2006.01)
*G01J 5/00* (2006.01)

(56) References Cited

U.S. PATENT DOCUMENTS

| | | | |
|---|---|---|---|
| 6,953,932 B2* | 10/2005 | Anderson | G01J 5/22 |
| | | | 250/338.1 |
| 7,180,067 B2* | 2/2007 | Wolske | G01J 5/06 |
| | | | 250/352 |
| 2004/0211907 A1* | 10/2004 | Wellman | G01J 5/061 |
| | | | 250/353 |
| 2007/0120058 A1 | 5/2007 | Blackwell et al. | |
| 2009/0084956 A1 | 4/2009 | Gat | |

* cited by examiner

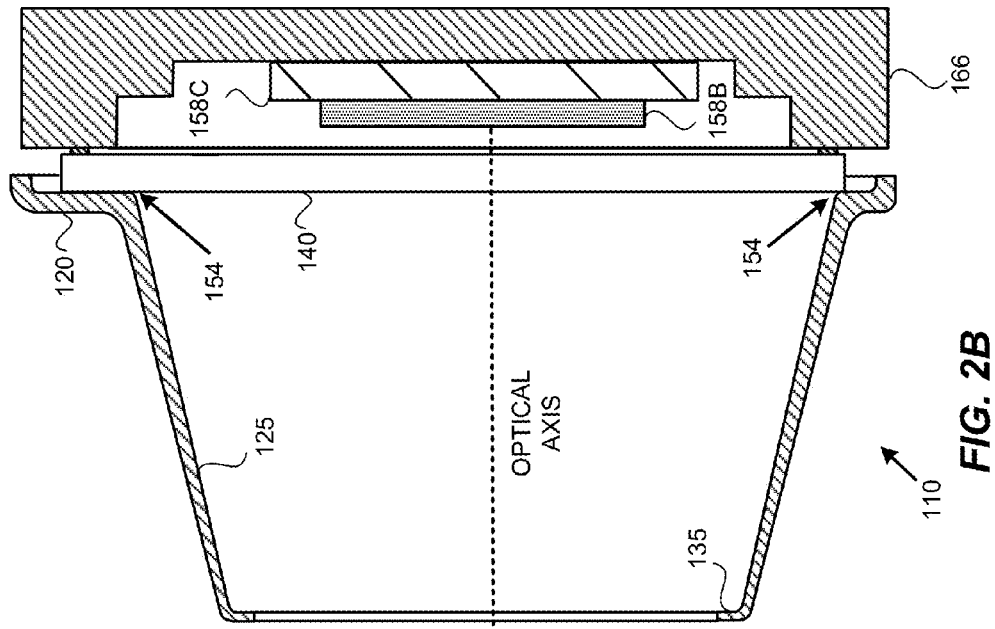
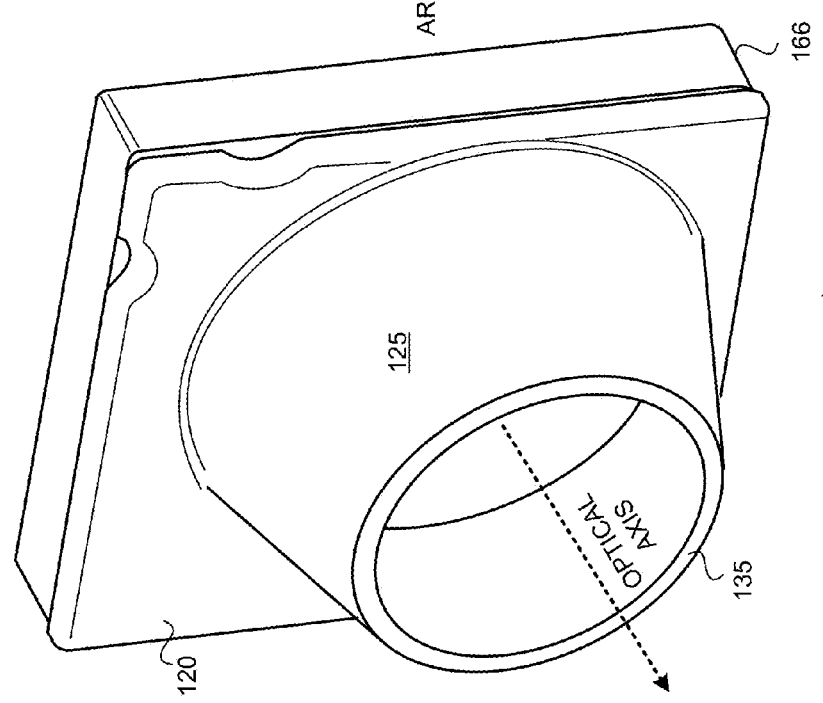
FIG. 2B
FIG. 2A

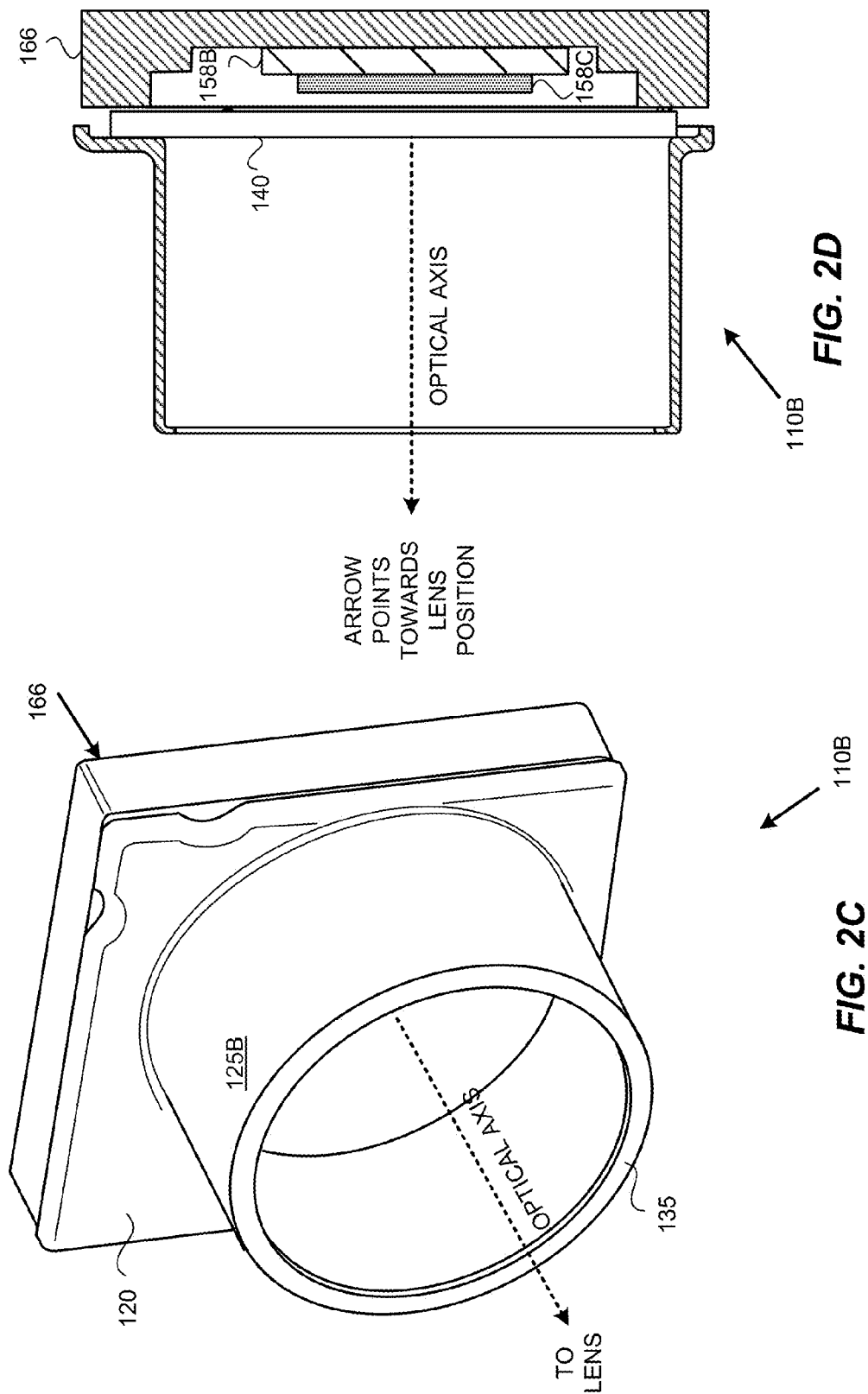

INTEGRATED RADIATION SHIELD AND RADIATION STOP

CROSS-REFERENCES TO RELATED APPLICATIONS

This application claims priority to U.S. Provisional Patent Application No. 61/784,992, filed Mar. 14, 2013, and entitled "Integrated Radiation Shield and Radiation Stop", which is incorporated by reference in its entirety for all purposes.

BACKGROUND OF THE INVENTION

This disclosure relates generally to an optical shielding system within an infrared imaging device, and methods for calibrating the device when the shielding system is used.

Thermographic cameras and imaging devices detect the spectrum and power of infrared radiation and use this information to form visible images. Instead of the 450-750 nanometer range of the visible light camera, infrared cameras may operate in wavelengths as long as 14,000 nm (14 µm).

Infrared energy is a part of the electromagnetic spectrum and encompasses radiation from gamma rays, x-rays, ultra violet, a thin region of visible light, infrared, terahertz waves, microwaves, and radio waves. These various categories of infrared radiation are defined by ranges of wavelengths. All objects emit a certain amount of infrared radiation, which changes as a function of object temperature.

In general, objects emit infrared radiation, and the profile of emitted infrared radiation is representative of a body's temperature. Infrared imaging system 105s detect this radiation much like an ordinary camera detects visible light. Infrared imaging system 105s have been used in various applications, particularly those operated in low light environments, such as those found at nighttime, in smoke-filled buildings, or underground. Infrared imaging has been valuable for military, rescue, and wildlife observations.

SUMMARY OF THE INVENTION

The invention that will be described herein may be embodied, for example, in an apparatus for shielding a detector from radiation. The apparatus includes a detector that measures radiation. The apparatus also includes a window that is thermally coupled to the detector and a shield, so that the window is in between the detector and the shield and thermally conductive pathways exist between the detector and the shield. The shield is designed to emit substantially constant radiation. The shield also substantially blocks radiation emitted by a camera housing that at least partially surrounds the shield. In this way, the detector more accurately measures radiation passing through an optical system and the shield.

The invention can be embodied in an apparatus. Such an apparatus may include a detector that measures radiation. The apparatus also includes a window that is relationally coupled with the detector and a shield, so that the window is in between the detector and the shield. The apparatus also includes a shield that emits substantially constant radiation. The shield also substantially blocks radiation from a camera housing coupled with the shield, so that the detector measures the radiation from the optical path and the shield. The apparatus also includes a shutter blade that substantially blocks radiation from an optical path toward the detector when the shutter blade is closed. The apparatus also includes a lens that directs light toward the detector.

The shield can be structured so as to have an annular shape. The shield can include a flange and conical-shaped casing, or tubular casing. A side of the shield facing away from the optical axis can be covered or conditioned by a reflective coating or treatment that enhances reflectivity. A side of the shield facing the optical axis can be covered by an emissive coating and/or conditioned by a treatment for enhancing emissivity. The shield can be thermally coupled to the window, and may be disposed in an ambient environment without suffering from performance degradation.

According to an embodiment of the present invention, an apparatus is provided. The apparatus includes a camera housing, a detector operable to measure radiation and disposed in the camera housing, and a window coupled to the detector. The apparatus also includes a shield coupled to the window and operable to block radiation from portions of the camera housing from impinging on the detector.

According to another embodiment of the present invention, an apparatus is provided. The apparatus includes a camera housing and a detector configured to measure radiation. The apparatus also includes a lens configured to refract light toward the detector, and along an optical axis and a shield configured to reflect radiation emitted by the camera housing. The shield emits radiation and the detector is configured to provide an output signal indicating characteristics of incident radiation refracted by the lens, and to compensate for effects of radiation emitted by the shield in providing the output signal. The apparatus also includes a window and a shutter blade. The window is coupled to the detector and the shield, so that the window is in between the detector and the shield. thermal pathways connect the shield to the detector. The shutter blade substantially blocks radiation from an optical path toward the detector when the shutter blade is closed.

According to a specific embodiment of the present invention, a method for calibrating a thermal imaging device is provided. The method includes imaging a scene on a detector in the thermal imaging device, providing a shield operable to shield the detector from non-scene radiation, and operating the detector at a first ambient temperature. The method also includes gathering first data representative of an output signal associated with the detector and a first detector temperature associated with the first ambient temperature, operating the detector at a second ambient temperature, and gathering second data representative of an output signal associated with the detector and a second detector temperature associated with the second ambient temperature. The method further includes calibrating the thermal imaging device to compensate for infrared radiation from the shield.

Numerous benefits are achieved by way of the present invention over conventional techniques. For example, embodiments of the present invention provide a radiation shield that can help limit extraneous radiation measurements at the detector to create a controlled radiation measurement with good radiometric accuracy. Moreover, the temperature of the shield may be less variable than other components in the system. In this way, the radiation noise emitted by the shield is fairly constant and easier to measure, model and compensate for. Further, the radiation shield may be used in conjunction with a radiometric lens, a shutter as close to the aperture stop as possible, and a highly isothermal lens cell, aperture stop, shutter, and detector. These and other embodiments of the invention, along with many of its advantages and features, are described in more detail in conjunction with the text below and attached figures.

BRIEF DESCRIPTION OF THE DRAWINGS

FIG. 2A shows a perspective drawing of an example uncooled radiation shield, as described in this disclosure.

FIG. 2B shows a close-up cutaway view of the radiation shield and its attachment relative to some of the many other components in a thermal imaging system.

FIG. 2C shows a perspective drawing of an example uncooled radiation shield having a tubular shape.

FIG. 2D shows a shows a close-up cutaway view of a radiation shield having a tubular shape, and its attachment relative to certain other components in a thermal imaging system.

DETAILED DESCRIPTION OF SPECIFIC EMBODIMENTS

Figure 1:
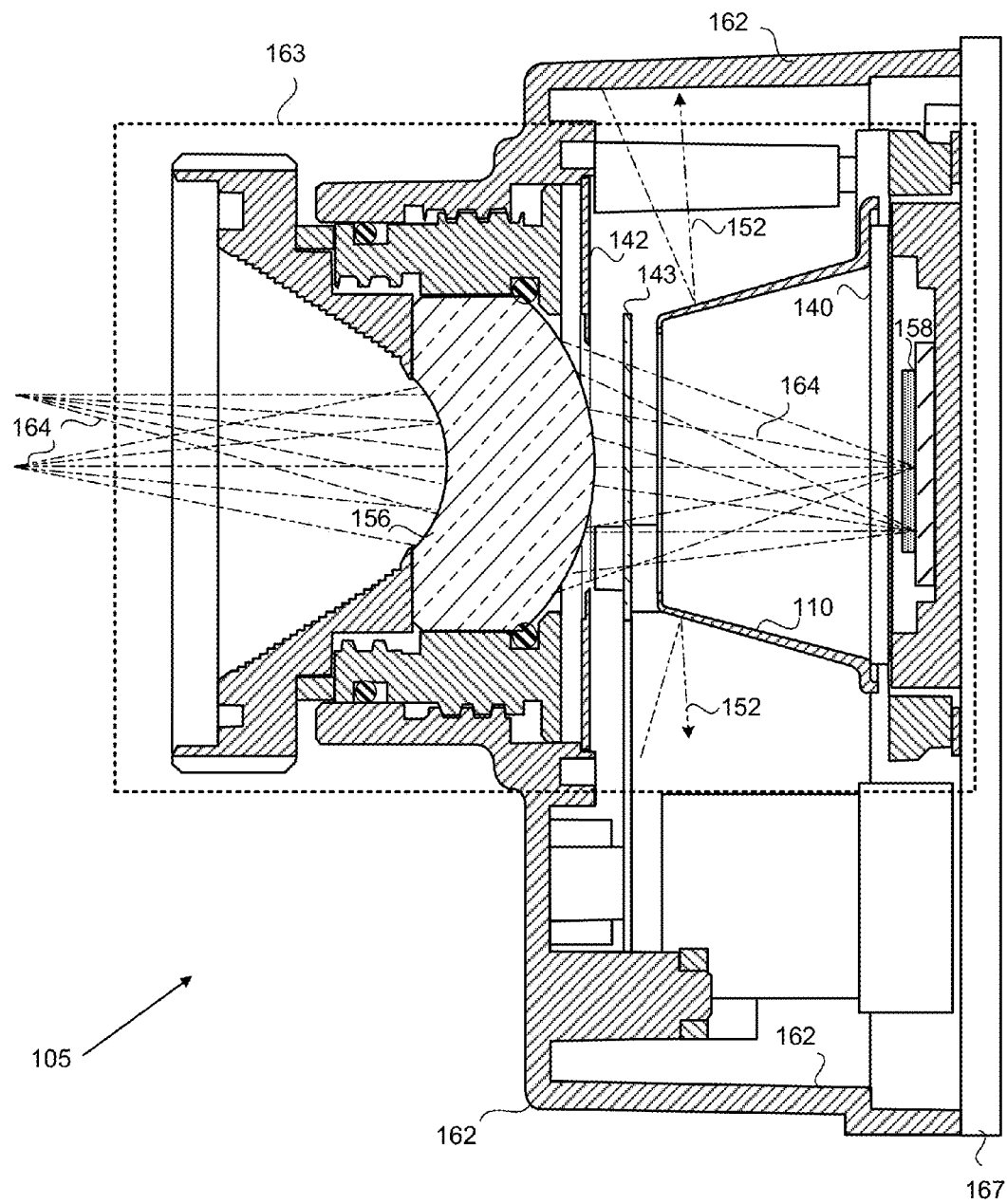
FIG. 1 is a is an oblique cutaway depiction of the arrangement of components in one example infrared imaging system in which an uncooled radiation shield may be incorporated.

Detectors used in thermal imaging systems are sensitive to radiation at all angles of incidence. Thus, within thermal imaging optical system, the detector may be vulnerable to being affected by thermal radiation emitted by the camera system and structural components outside of the optical path. Without shielding or compensatory measures, if such radiation reaches the detector, the detector's output may not accurately represent the thermal condition of objects in the thermal scene and image distortion will result. For that reason, this type of undesirable thermal radiation will be referred hereinafter as "thermal radiation noise".

To control the effect of thermal radiation noise, radiation shields have been used in thermal imaging systems to shield the detector, thereby preventing unwanted radiation from interfering with the measurement of radiation from the thermal scene. Although thermal radiation noise can be substantial, with a radiation shield in place, much of the thermal radiation emitted by system components can be reflected prior to reaching the detector. Consequently, the vast majority of radiation that reaches the detector is scene radiation, and controlled radiation from the radiation shield interior surfaces, and an accurate image of the scene can be generated.

Although radiation shields reflect large amounts of thermal radiation noise, radiation shields themselves have the potential to emit substantial radiation that can interfere with the radiometric accuracy of a detector. For this reason, in conventional thermal imaging systems, the radiation shield is disposed as one enclosure of a hermetically sealed chamber that holds the detector and surrounds the optical axis. In this configuration, active thermo-electric cooling (sometimes to cryogenic temperatures) of the shield is used to stabilize the thermal radiation that it emits. This approach a thermal imaging system requires a substantial amount of energy consumption as a result of this need to provide temperature stabilization. Additionally, the approach entails structural and design complexities because the shield must be mounted as one enclosure of a large hermetically sealed chamber.

This disclosure describes a radiation shield designed to be used within a true uncooled infrared imaging system that does not require active temperature stabilization. The disclosed shield is configured to effectively limit thermal radiation noise from interfering with detection of a thermal scene. To emphasize this point, the shield will at times be referred to as an "uncooled radiation shield."

Although it may be uncooled, the shield is designed to have a reflective outer surface so as to prevent the shield from changing temperature due to impinging radiation. In this way, the radiation that the shield emits towards the detector is substantially uniform. The shield's thermal characteristics, structure and mounting facilitate a novel calibration process that is used to accurately measure and compensate for the various effects of any radiation emitted by the shield.

FIG. 1 is an oblique cutaway depiction of the arrangement of components in one example infrared imaging system 105 in which the radiation shield may be used. FIG. 1 will be described herein in conjunction with FIGS. 2A and 2B. FIG. 2A shows a perspective drawing of the radiation shield, and FIG. 2B shows a close-up cutaway view of the radiation shield and its attachment relative to some of the many other components in a thermal imaging system 105.

In FIGS. 1, 2A and 2B, the uncooled radiation shield (which will also be referred to hereinafter as a "shield" or "radiation shield") is depicted at 110. As shown in FIG. 2A, the uncooled radiation shield 110 has an annular shape with a rounded and tapered casing 125 for reflecting thermal radiation noise emitted by peripheral system components. At the wide end of the casing 125, a flange 120 provides an attachment point at which the uncooled radiation shield 110 is affixed to a transmissive detector window 140. The attachment of the flange 120 to the detector window 140 can be seen in FIG. 2B, at 154. The detector window 140 is a silicon or germanium window and, together with detector mounting 166, forms a hermetically sealed detector package within which an infrared radiation detector 158 is mounted.

FIGS. 2C and 2D provide an alternative design of the radiation shield. In most regards, the design shown in FIGS. 2C and 2D is generally the same as the design shown in FIGS. 2A and 2B. However, whereas the radiation shield 110 shown in FIGS. 2A and 2B has tapered casing, the casing 125B of the radiation shield 110B in FIGS. 2C and 2D is tubular, and extends perpendicularly outwards from the flange 120. Either the tubular or tapered shapes may be used interchangeably, and the scope of this disclosure should be interpreted as covering radiation shields having either such shape, or any other shape rendered apparent by the description provided herein. For this reason, in subsequent paragraphs, any reference to a radiation shield is not intended to suggest or imply a particular shape of the shield, regardless of the enumeration ("110" or "110B") provided.

As shown in FIG. 1, the uncooled radiation shield 110 may be used in a thermal imaging system 105 having optical and imaging components as well as other structural, mounting and casing components disposed around the optical components. The optical and imaging components include components such as a radiometric lens 156, and the aforementioned detector window 140 and infrared radiation detector 158. A shutter blade 142 is disposed between the lens 156 and the radiation shield 110. During calibration, the shutter blade 142 may be closed to prevent scene radiation 164 from reaching the detector 158. In this configuration, only radiation emitted by the shield 110 will reach the detector 158, making it possible to precisely measure the radiation characteristics of the shield 110 at various operating temperatures. Although not specifically enumerated, the infrared imaging system 105 can also contain an optical stop and stray light baffle, and a solenoid assembly that moves the shutter blade 143.

The infrared radiation detector 158 (which will also be referred to hereinafter as "detector 158" or "radiation detector 158") may be implemented as a multi-part device. For example, as depicted in FIG. 1 and in FIG. 2B, the radiation detector 158 includes a bolometric array unit 158B that is mechanically affixed and both thermally and electrically coupled to an image processing integrated circuit (IC) 158C. In this example configuration, a detection surface of the bolometric array unit 158B faces towards the lens 156 and includes an array of photoelectric pixels. At each pixel, incident radiation causes generation of an electrical signal representative of the power and frequency spectrum of the incident radiation.

Each such electrical signal is input to the image processing IC 158C. The image processing IC 158C also receives an input indicating the temperature at its outer surfaces. As will be more thoroughly explained later, the radiation shield 110 and image processing IC 158C are mounted and bonded such that thermally conductive pathways exist between these two components (e.g., these components are thermally coupled). Consequently, the temperature at the outer surfaces of the image processing IC 158C is substantially similar to the temperature of the radiation shield 110, and the temperature input signal effectively represents the shield temperature.

The structural, mounting and casing components surround the optical components and the uncooled radiation shield 110 in the infrared detection system. The structural, mounting and casing components will be referred to hereinafter as the "system housing". This term will be used in a general sense, and should not be understood to precisely specify any component or combination of components in the infrared detection system. In FIG. 1 for example, the system housing includes multiple mechanical components having an approximate position and disposition roughly suggested by the arrows at 162.

The radiation shield 110 is disposed in the infrared imaging system 105 so as to reflect thermal radiation noise emitted by the system housing 162 or originating in the ambient environment. For example, FIG. 1 shows the uncooled radiation shield 110 reflecting thermal radiation noise 152 and preventing it from reaching the infrared radiation detector 158. By reflecting thermal radiation noise 152, the uncooled radiation shield 110 prevents interference with the measurement of thermal scene radiation 164 at the detector 158.

As illustrated in FIG. 2A, at the tapered end of the radiation shield 110, the casing 125 ends at a round rim 135 that surrounds an aperture. The aperture enables some scene radiation 164 to pass unimpeded from the lens 156 to the detector 158. FIG. 1 shows an aperture stop 142 (e.g. limiting aperture) located to the left of the rim 135. The aperture stop 142 reflects some of the scene radiation 164 previously refracted at the periphery of the lens 156. Although not specifically depicted in any of the drawings, this reflected scene radiation 164 does not reach the detector 158, thereby limiting the cone angle at each focus position.

Additionally or alternatively, the rim 135 around the aperture can serve as an aperture stop within the infrared imaging system 105. When the rim 135 serves as a limiting aperture, it may provide further reflection of scene radiation, above and beyond reflection provided by aperture stop 142. Alternatively the rim 135 may be used in place of aperture stop 142.

The uncooled radiation shield 110 has a reflective outer surface that faces away from the optical axis of the thermal imaging system 105, and an emissive inner surface that faces the optical axis. The emissive inner surface provides for absorption of thermal radiation noise which may be occasionally admitted, along with scene radiation 164, through the opening at the tapered end of the uncooled radiation shield 110. Absorption of this thermal radiation noise (not specifically shown) prevents it from reflecting off the inner surface of the uncooled radiation shield 100 and interfering with the detector 158.

However, increased absorption of radiation at the emissive internal surface of the radiation shield 110 implies that the internal surface also emits increased thermal radiation which inevitably reaches the detector 158. Nonetheless, this arrangement is preferable because the calibration and compensation process enables the thermal radiation emitted by the shield 110 to be compensated for during the image processing performed by the image processing IC 158C.

Also, because the radiation shield 110 is not cryogenically cooled, it emits more radiation than other radiation shields characterized by conventional designs. Although the shield may emit substantial radiation, the reflective outer surface serves to stabilize the radiation shield temperature so that it is relatively constant as compared to the ambient environment and temperature of the housing 162. Because of the relatively constant temperature of the uncooled radiation shield 110, its radiation profile remains relatively constant even as the ambient environment or housing undergoes substantial temperature changes. This consistency has the effect of increasing the reliability of the determinations made during the calibration process, as well as the efficacy of the image processing adjustments that are made in response thereto.

As was mentioned previously, in addition to reflecting thermal radiation noise 152 while operating at a consistent temperature, the uncooled radiation shield 110 described in this disclosure is thermally coupled to the detector 158 of the imaging device. As a result of the thermally conductive coupling of the uncooled radiation shield 110 to the detector, the detector 158 temperature closely tracks the temperature of the uncooled radiation shield 110 in a predictable way.

At the detector 158, a temperature sensor provides an input to the image processing IC 158C. Although the temperature sensor is located at the detector 158, the temperature it measures is representative of the radiation shield 110 temperature because of the thermally conductive coupling of the shield to the detector 158. During operations of the image processing IC 158C, compensation for the thermal radiation emitted by the shield can be made in view of the sensed temperature and the corresponding shield emissions determined during calibration of the device.

In the example infrared imaging system 105 design depicted in FIG. 1, the uncooled radiation shield 110 is thermally coupled to the detector 158 without being directly attached to the detector itself. For example, FIG. 1 shows that the uncooled radiation shield 110 is affixed flush to the optical window 140. In turn, the optical window 140 forms a hermetically sealing contact with the mounting 166 on which the infrared radiation detector 158 is affixed. In this way, the radiation detector 158 is encapsulated by the detector window 140 and the mounting 166, and operates within a vacuum environment. The connections and mechanical bonds between these components create a thermally conductive pathway between the various connected components, thereby facilitating substantial and rapid heat transfer from the radiation shield 110 to the detector 158. The conductive coupling causes the temperature sensed at the detector 158 to change in lockstep with any temperature changes undergone by the radiation shield 110.

In the configuration shown in FIG. 1 and FIG. 2B, the radiation shield 110 may be bonded to the detector window 140. The bonding may be created using a double-sided adhesive film (e.g., tape), glue, spring clips, thermal adhesives, thermal epoxy, or other bonding materials that are characterized by a high thermal conductivity. The bonding may be applied directly to the radiation shield 110 and window 140. One example method for bonding the radiation shield 110 to the window 140 may involve placing small dots of epoxy along the edge of the radiation shield 110. Other bonding techniques are also included within the scope of the present invention.

The radiation shield 110 itself can be formed of any of a variety of thermally conductive metals or metal alloys, including copper-nickel-copper cladding, copper-nickel-copper-gold cladding, copper-beryllium cladding, gold, nickel, magnesium, or aluminum. For certain thermal imaging systems containing the uncooled radiation shield 110, it may be preferable to minimize the thickness of the radiation shield 110 casing 125 so that the temperature of the radiation shield 110 reacts quickly and uniformly to temperature changes in the ambient environment. For example, the inventors have achieved strong radiation shield performance by forming casing 125 from a nickel plate IAW QQ-N-290, class 2, thickness 0.0080 minimum. They have also improved results by making the radiation shield 0.020" oversize at an exit plane relative to a ray bundle, and by applying Krylon Ultra Flat Black Enamel to the inner surface of the radiation shield 110, with a surface coating of 32 micro inches RMS per ASME B46.1. A bend radii of 0.010 inches has been shown to be advantageous for forming the intersection at which the casing 125 intersects with the flange 120.

Coating or anodizing processes can be employed during manufacture of the uncooled radiation shield 110. Depending on the material used to fabricate the radiation shield 110, the use of particular coating or anodizing processes may facilitate attaining high reflectivity on the outer surface of the shield casing 125, and high emissivity on the inner surface. The highly emissive inner surface of the uncooled radiation shield 110 can be created by covering the surface with a paint (e.g., infrared black paint), oxide coating, or other highly emissive layering material. The reflective outer surface may be an unfinished metal surface.

In order to minimize reflections, high emissivity coatings or finishes can be placed on any additional surfaces that face the detector 158. Reflective finish can be placed on all surfaces facing away from detector to minimize scene heating effects.

The infrared imaging system 105 can be implemented so that certain of its components are part of a thermal cell 163 assembly. A bias board, main board, standoffs, and a socket adapter may be incorporated in the design. In FIG. 1, the main board is depicted at 167. However, the bias board, standoffs and socket are not explicitly shown or enumerated. The bolometric array 158B or detector window 140 can have a custom socket with alignment features and baffle retention springs. Double-hash features on the radiation shield 110 can be engaged with the spring clips on the socket.

The infrared imaging system 105 may feature a compartmentalized structure. For example, the thermal cell 163 may be designed to isolate imaging system 105 surfaces and components from heat sources, including accessory components such as main board 167, and other components not specifically enumerated in FIG. 1, such as a wireless module and a battery. The thermal cell 163 may be designed to contain any or all of the optical components of the imaging system 105, and to be approximately bisected by the optical axis.

The infrared imaging system 105 may include features for internal temperature management. In an embodiment, the main board 167 can be thermally grounded to a stamped metal rear cover (not shown) that serves as a primary system heat sink. Selected IC's (e.g., system-on-chip processor, FPGA, memory, wireless module) may be thermally padded to the rear cover if needed.

Although not specifically enumerated, the imaging system 105 may also include features for minimizing handling impact. A focus knob can be fabricated to minimize transmission to the lens element. In an embodiment, the focus knob can be fabricated from Glass Filled PEEK.

During a calibration process prior to normal imaging operations, shutter 143 is closed so that scene radiation 164 does not reach the detector 158. Subsequently, the ambient environment of the infrared imaging system 105 is altered. The change to the ambient environment causes the radiation shield 110 temperature to change, accompanied by corresponding changes in the temperature sensed at the detector 158. At several different radiation shield 110 (and detector) temperatures reached during this process, the radiation incident on the detector 158 is measured. Because the shutter 143 remains closed, the incident radiation at each temperature is attributable to shield emissions, and is representative of what the shield's radiation will be during future operations at the same temperature. Image processing parameters and settings within the system can then be changed so that, in actual operations of the imaging system 105, an adjustment for the radiation profile of the shield 110 is done based on the current temperature of the shield 110 and the detector 158.

Figure 3:
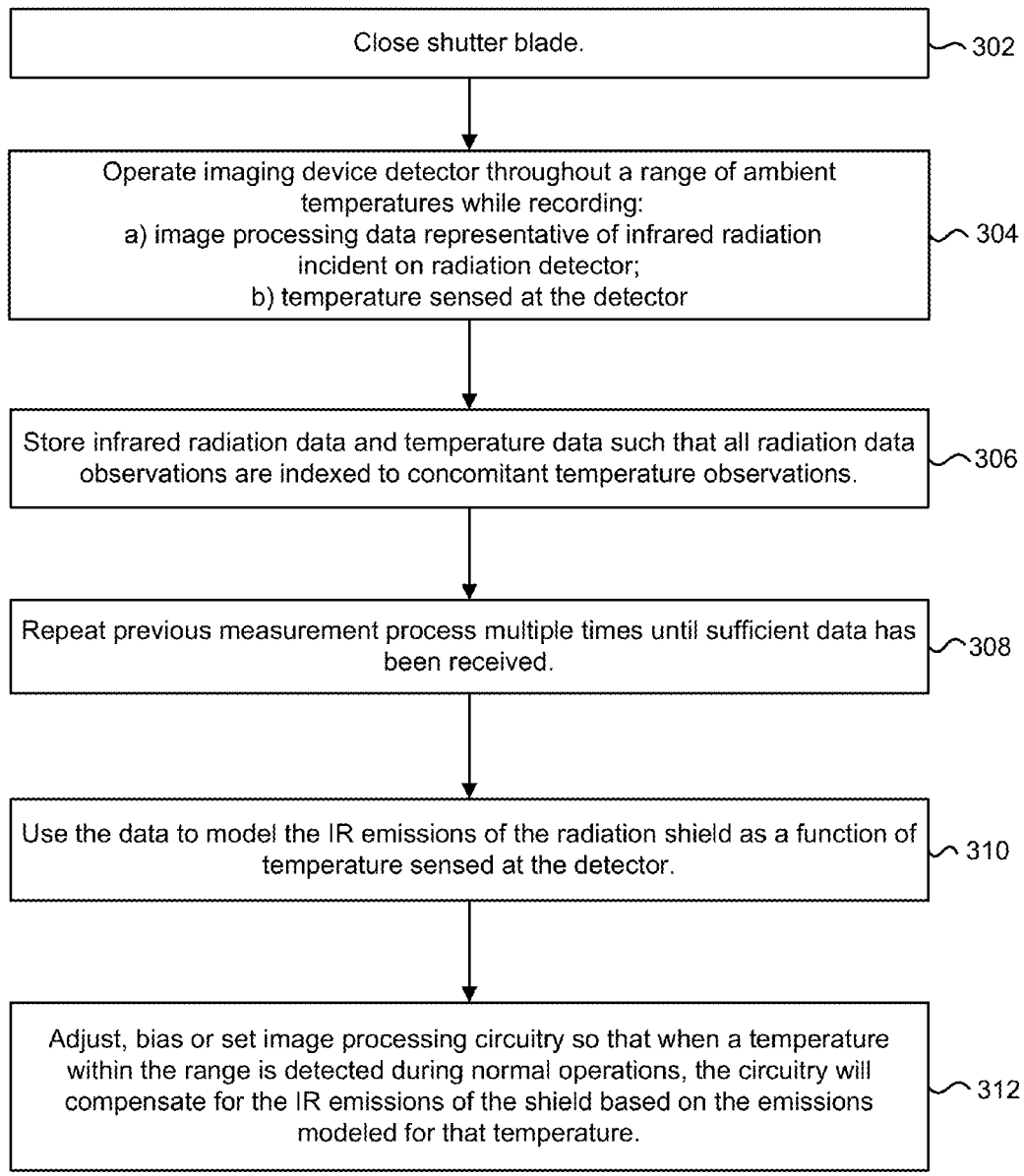
FIG. 3 is a flow diagram illustrating example operations for calibrating a thermal imaging system which incorporates the uncooled radiation shield design described herein.

FIG. 3 depicts example operations that may be performed to calibrate the infrared imaging system 105. As depicted 302, the shutter blade of the imaging system is closed. Then, at 304, the imaging system 105 detector 158 is operated throughout a range of ambient temperatures, while calibration data is recorded. The calibration data includes image processing data representative of infrared radiation incident on the detector 158, and the temperature sensed at the detector 158. At 306, the infrared radiation data and temperature data are stored such that all radiation data observations are indexed to concomitant temperature observations.

At 308, the measurement process that includes steps 304 and 306 is repeated multiple times until sufficient data has been recorded. At 310, the recorded data is used to model the IR emissions of the radiation shield 110 as a function of temperature sensed at the detector. At 312, image processing circuitry is adjusted, biased, or set so that when a temperature within the range is detected during normal operations, the circuitry will compensate for the IR emissions modeled for the particular temperature.

Figure 4:
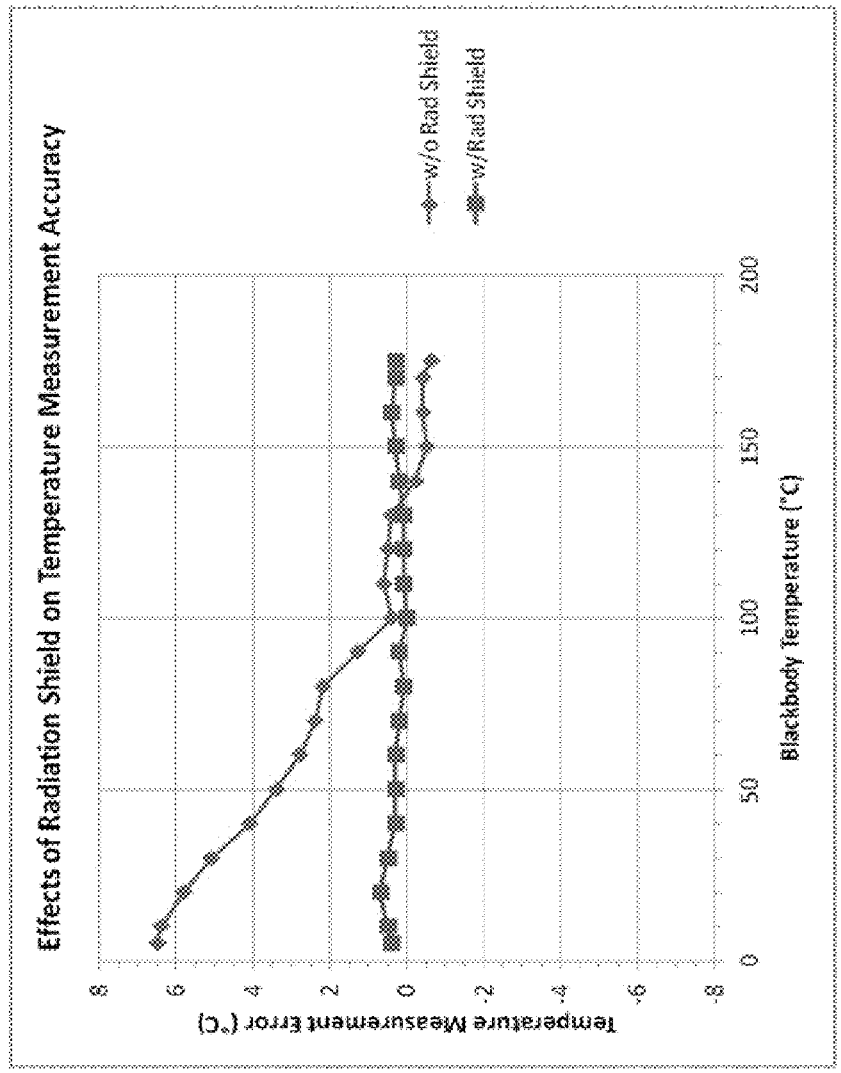
FIG. 4 is a high level chart illustrating performance characteristics of an imaging system incorporated an uncooled radiation shield as described in this disclosure.

During testing of a thermal imaging system 105 incorporating the uncooled radiation shield 110, the inventors achieved blackbody thermal scene detection accuracy consistently within either of ±2° C. or ±2%, depending on the temperature of the black body. These results are summarized in FIG. 4, which also shows the improvement in scene temperature measurement accuracy provided by use of the shield 110. In addition to the result shown in FIG. 4, the system 105 has demonstrated good insensitivity to object focus and a constant f-number with object focus. The system has also demonstrated insensitivity to handling, with small change in temperature measurement with handling and residual error corrected with one-point (offset) shutter calibrations. As compared to conventional radiation shield designs known in the art, use of the radiation shield 100 disclosed herein can also facilitate reduction in radiographic errors that tend to result from ambient temperature changes and handling of a thermal imaging system. These radiographic errors can be corrected with one-point (offset) shutter calibrations, and either performed manually or with appropriate auto-calibration periodicity.

The thermal imaging system 105 may further incorporate isothermal design principles. For example, critical surfaces and components can be connected through high conductivity paths. The disposition of components within closed thermal cell 163 creates a more uniform ambient environment. The exposed metal housing can react quickly to changes in outside ambient temperatures. According to embodiments of the present invention, critical surfaces and components can be connected through high conductivity paths.

Thus, according to embodiments of the present invention, the optic path is a component that implements and improves the thermal cell design. The radiation shield can nearly eliminate transient housing impact on measurement accuracy. Additionally, the radiometric stop and shutter blade position can reduce or minimize stray radiation effects. In an embodiment, the cell housing (and/or optics) may be aligned to the detector socket via pins.

Figure 5:
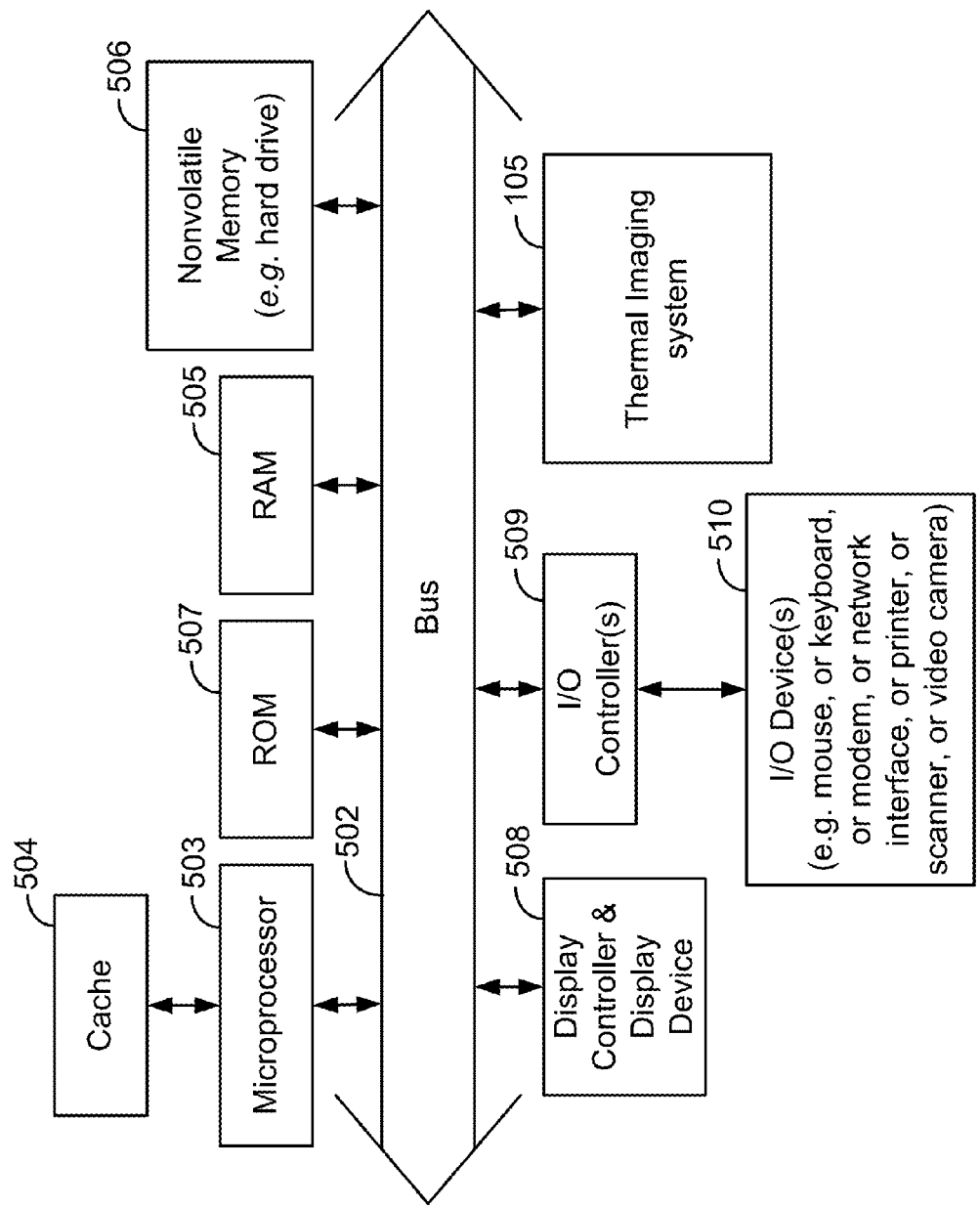
FIG. 5 is a high level schematic diagram illustrating certain image processing and data storage components that may be used in conjunction with the thermal imaging system.

FIG. 5 is a high level schematic diagram illustrating certain image processing and data storage components that may be used in conjunction with the thermal imaging system 105. The thermal imaging system 105, in combination with components such as those depicted in FIG. 5, may form a standalone infrared camera, hand-held device, or may be a component system within a larger computing apparatus such as a mobile telephone, tablet, or laptop computer. The image processing components depicted in FIG. 5 can be used to process, manipulate, store, output, communicate or project thermal or image data generated by the thermal imaging system 105.

Although FIG. 5 illustrates various components, it is not intended to represent any particular architecture or manner of interconnecting the components, such details are not germane to the techniques described herein. As depicted in FIG. 5, the components include a system bus 502 which is coupled to a microprocessor 503, a Read-Only Memory (ROM) 507, a volatile Random Access Memory (RAM) 505, as well as other nonvolatile memory 506. In the illustrated example, microprocessor 503 is coupled to cache memory 504. System bus 502 can be adapted to interconnect these various components and also to connect components 503, 507, 505 and 506 to a display controller and display device 508 and peripheral interfaces such as input/output ("I/O") devices 510. The I/O devices 510 may be components such as keyboards, modems, network interfaces, printers, scanners, video cameras, or other devices suitable for interfacing with image processing components. Typically, I/O devices 510 are coupled to the system bus 502 through I/O controllers 509.

The I/O controller 509 may include a Universal Serial Bus ("USB") adapter for controlling USB peripherals, or may include any other type of bus adapter. RAM 505 can be implemented as dynamic RAM ("DRAM") which requires power continually in order to refresh or maintain the data in the memory. The other nonvolatile memory 506 can be a magnetic hard drive, magnetic optical drive, optical drive, DVD RAM, flash memory, or other type of memory system that maintains data after power is removed from the system. While FIG. 3 shows that nonvolatile memory 506 as a local device coupled with the rest of the components in the data processing system, it will be appreciated by skilled artisans that the described techniques may use a nonvolatile memory remote from the infrared imaging system 170, such as a network storage device coupled with the data processing system through a network interface such as a modem or Ethernet interface (not shown).

In view of the aforementioned examples, descriptions and information related to the uncooled radiation shield and thermal imaging system, it should be apparent that any combination of software, hardware, or firmware may be used to implement certain of the inventive features and processes that have been described. It should also be understood that embodiments can employ various computer-implemented functions involving data stored in a data processing system. That is, the techniques may be carried out in a computer or other data processing system in response to executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus comprising:
a camera housing;
a detector operable to measure radiation and disposed in the camera housing;
a shield directly attached to a hermetically sealed chamber that holds the detector; and a window coupled to the detector and disposed between the detector and the shield.

2. The apparatus of claim 1 wherein the window, together with a detector mounting, forms a hermetically sealed detector package within which the detector is mounted.

3. The apparatus of claim 1 wherein the shield comprises an annular-shaped casing.

4. The apparatus of claim 1 wherein the shield comprises conical-shaped walls and a flange.

5. The apparatus of claim 1 wherein the shield comprises a first reflective outer surface and a second emissive inner surface, wherein the first reflective outer surface faces the detector and the second emissive inner surface faces away from the detector.

6. The apparatus of claim 1 wherein the shield is thermally coupled to the window.

7. The apparatus of claim 1 wherein a vacuum environment is present between the detector and the window, wherein the shield is positioned outside of the vacuum environment.

8. An apparatus comprising:
a camera housing;
a detector configured to measure radiation;
a lens configured to refract light toward the detector, and along an optical axis;
a shield directly attached to a hermetically sealed chamber that holds the detector, the shield being configured to reflect radiation emitted by the camera housing, wherein the shield emits radiation and the detector is configured to provide an output signal indicating characteristics of incident radiation refracted by the lens, and to compensate for effects of radiation emitted by the shield in providing the output signal;
a window, wherein the window is coupled to the detector and the shield, so that the window is in between the detector and the shield, wherein thermal pathways connect the shield to the detector; and
a shutter blade, wherein the shutter blade substantially blocks radiation from an optical path toward the detector when the shutter blade is closed.

9. The apparatus of claim 8 wherein the shield comprises an annular-shaped casing.

10. The apparatus of claim 8 wherein the shield comprises a conical-shaped casing.

11. The apparatus of claim 8 wherein the shield comprises a first reflective outer surface and a second emissive inner surface, wherein the first reflective outer surface faces the detector and the second emissive inner surface faces away from the detector.

12. The apparatus of claim 8 wherein the shield is thermally coupled with the window.

13. The apparatus of claim 8 wherein the apparatus further comprises a hermetic seal formed by the window, wherein the hermetic seal encloses the detector.

14. A method for calibrating a thermal imaging device, the method comprising:
imaging a scene on a detector in an uncooled thermal imaging device;
providing an uncooled shield operable to shield the detector from non-scene radiation;
providing a shutter blade disposed in a closed position between a lens and the shield;
operating the detector at a first ambient temperature;
gathering first data representative of an output signal associated with the detector and a first detector temperature associated with the first ambient temperature;
providing the shutter blade disposed in an open position between the lens and the shield;
operating the detector at a second ambient temperature;
gathering second data representative of an output signal associated with the detector and a second detector temperature associated with the second ambient temperature; and
calibrating the thermal imaging device to compensate for infrared radiation from the shield.

15. The method of claim 14 wherein calibrating the thermal imaging device is performed as a function of the first detector temperature and the second detector temperature.

16. The method of claim 14 wherein the shield surrounds a periphery of the detector.

17. The method of claim 14 wherein the output signal associated with the detector results from infrared radiation from the shield and the scene impinging on the detector.

18. The method of claim 14 wherein the output signal associated with the detector results from infrared scene radiation incident on the detector.

19. The method of claim 14 wherein the thermal imaging device comprises an optical window coupled to the detector, wherein the optical window and detector form a hermetically sealed chamber.

20. The method of claim 14 wherein light from a scene propagates along an optical axis to the detector, and wherein the shield surrounds the optical axis such that an inner surface of the shield faces the optical axis and an outer surface of the shield faces away from the optical axis.

21. The method of claim 20 wherein the outer surface is a reflective surface and the inner surface is an emissive surface, and wherein the thermal imaging device includes housing that emits infrared radiation, and wherein the shield is configured to reflect radiation emitted by the housing such that the radiation is prevented from reaching the detector.

* * * * *